S. H. BEVINS & D. W. BENJAMIN.
Meat-Holders.

No. 151,001.  Patented May 19, 1874.

Witnesses
Chas H Smith
Harold Serrell

Inventors
Seth H Bevins
Daniel W Benjamin
per Lemuel W Serrell
atty

UNITED STATES PATENT OFFICE.

SETH H. BEVINS AND DANIEL W. BENJAMIN, OF JERSEY CITY, N. J.

IMPROVEMENT IN MEAT-HOLDERS.

Specification forming part of Letters Patent No. 151,001, dated May 19, 1874; application filed March 17, 1874.

*To all whom it may concern:*

Be it known that we, SETH H. BEVINS and DANIEL W. BENJAMIN, of Jersey City, in the county of Hudson and State of New Jersey, have invented an Improvement in Butchers' Meat-Holders, of which the following is a specification:

Beefsteaks are often too thick, and require to be subdivided. To do this is very difficult, as one portion is liable to be cut much thicker than the other in consequence of the lack of a suitable holder, and in cutting steaks, especially in warm weather, the meat is unsupported, and the steak cannot be separated of a uniform thickness.

Our invention is to facilitate the operation of the butcher in cutting off slices of meat for steaks, &c., and supporting the bone while being sawed.

We make use of two clamping-faces, one of which is movable by a screw or lever below the bed, and said faces are above the bed, so that when the piece of meat is laid upon the bed, and pressed by the faces at its sides, it is held sufficiently to keep the parts in position while being cut or sawed; and the surface of the metal bed carrying the parts is provided with a wooden guard, that serves to prevent injury to the saw or knife by the metal.

Figure 2:
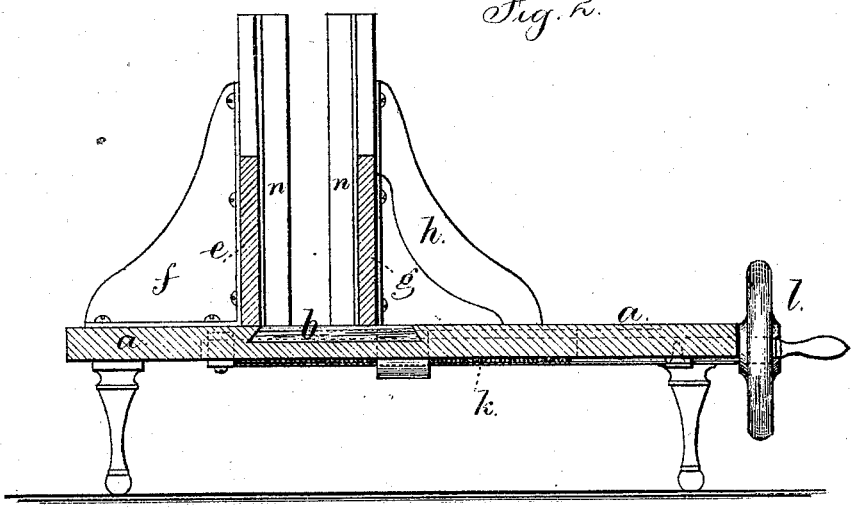
Figure 1:
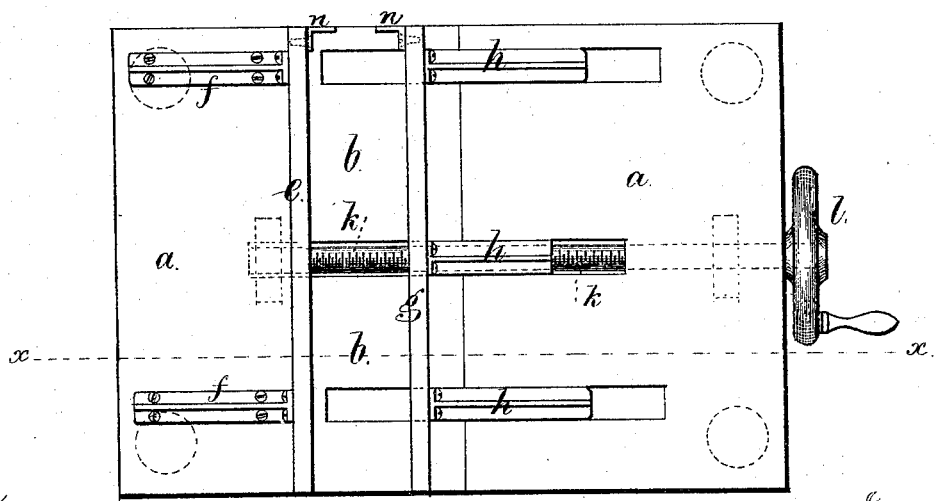

In the drawing, Figure 1 is a plan of the meat-holder, and Fig. 2 is a vertical section at the line $x\ x$.

The bed $a$ is preferably of metal, with a dovetailed recess in its upper surface, into which the wooden guard $b$ is driven, and upon this bed $a$ is the clamping face $e$, sustained by the bracket-pieces $f$; and the moving face $g$ is provided with guide and supporting-brackets $h$, and it is moved by the screw $k$, that is below the bed, and provided with a hand-wheel, $l$, at the end. This screw acts upon a nut that projects down from the face $g$ through a slot in the bed. A lever might be employed instead of the screw. The flanges $n$ at the edges of the faces $e$ and $g$ serve to sustain the bone of the meat while being sawed.

It will now be understood that the steak or piece of meat to be subdivided is placed between the faces $e\ g$, and they are pressed lightly upon the same. The meat is then cut, and the bone, if any, rests against the flanges $n$ while being sawed.

We claim as our invention—

The meat-holder made of the vertical clamping-faces above and at right angles to the supporting bed or block, with projections for supporting the bone while being sawed, and mechanism for moving one of the clamps, substantially as set forth.

Signed by us this 13th day of March, A. D. 1874.

SETH H. BEVINS.
D. W. BENJAMIN.

Witnesses:
GEO. T. PINCKNEY,
CHAS. H. SMITH.